(12) United States Patent
Lin

(10) Patent No.: US 6,257,127 B1
(45) Date of Patent: Jul. 10, 2001

(54) APPARATUS FOR MAKING SPRING-ROLL SKIN FROM DOUGH

(76) Inventor: Chao-Hung Lin, No. 127, Chung-Hsing N. St., Sanchung (TW)

( * ) Notice: Subject to any disclaimer, the term of this patent is extended or adjusted under 35 U.S.C. 154(b) by 0 days.

(21) Appl. No.: 09/773,162

(22) Filed: Jan. 30, 2001

(51) Int. Cl.⁷ .............................. A23L 1/00; A21C 9/00; A21C 9/06; A21C 11/00; A23P 1/00
(52) U.S. Cl. ........................ 99/353; 99/388; 99/450.1; 99/450.6; 99/450.7; 99/516
(58) Field of Search .................. 99/352–355, 385–388, 99/443, 443 R, 444–450, 450.1–450.8, 494, 516, 534, 536; 118/669, 672–674, 679, 310, 407, 315, 429, 602, 694, 63, 76, 77; 141/117; 425/391, 112, 403, 283, 284, 133.1, 308, 307, 131.1, 321, 325, 335; 426/512, 500–502, 231

(56) References Cited

U.S. PATENT DOCUMENTS

| | | | |
|---|---|---|---|
| 3,602,154 | * | 8/1971 | Schimkat et al. ................ 99/450.7 |
| 3,679,338 | * | 7/1972 | Lutz ................................... 99/353 X |
| 3,881,404 | * | 5/1975 | Ohkawa .............................. 99/353 |
| 3,934,043 | * | 1/1976 | Haas et al. ........................... 426/283 |
| 4,043,856 | * | 8/1977 | Steward .............................. 156/195 |
| 4,065,533 | * | 12/1977 | Koppl et al. ....................... 99/353 X |
| 4,664,027 | * | 5/1987 | Pauron ............................... 99/450.6 |
| 4,795,652 | * | 1/1989 | Cooper ............................. 426/501 X |
| 4,848,218 | * | 7/1989 | Battaglia ............................ 99/450.7 |
| 4,899,650 | * | 2/1990 | Larsen ............................... 99/450.7 |
| 4,992,285 | * | 2/1991 | Larsen ............................... 426/297 |
| 5,161,458 | * | 11/1992 | Cheung ............................... 99/450.1 |
| 5,417,992 | * | 5/1995 | Rizvi et al. ......................... 99/450.7 |

* cited by examiner

Primary Examiner—Timothy F. Simone
(74) Attorney, Agent, or Firm—Brinks Hofer Gilson & Lione

(57) ABSTRACT

An apparatus for making a printed spring-roll skin includes a forming drum having a circumferential heating surface to form a skin from dough, a dough feeder having an outlet adjacent to the heating surface, a scraper disposed adjacent the heating surface to remove the skin from the heating surface, and a printing roller disposed rotatably adjacent the forming drum and having a circumferential printing surface in contact with the heating surface. First and second intermeshed gears are respectively disposed coaxially with the forming drum and the printing roller so as to drive the same simultaneously. A coloring agent is supplied to the printing roller to print the drum surface which transfers a print to the skin.

6 Claims, 4 Drawing Sheets

US 6,257,127 B1

APPARATUS FOR MAKING SPRING-ROLL SKIN FROM DOUGH

BACKGROUND OF THE INVENTION

1. Field of the Invention

The invention relates to an apparatus for making spring-roll skin, more particularly, to an apparatus which is capable of providing marks on spring-roll skin during the production of the latter.

2. Description of the Related Art

Traditionally, spring-rolls are made by hand by preparing dough and contacting the same with pre-heated pans. As soon as the dough is adhered to the pans, the dough is dried and formed into spring-roll skins on the pans. After the skins are removed from the pans with the use of a turner, they are used to wrap stuffing which generally consists of meat and vegetable. Some spring-roll skin makers provide marks or patterns on the skins by using edible coloring materials so as to improve the appearance or to promote sales.

For mass production, it is known in the art to produce spring-roll skin by using a machine which typically includes a forming drum. The forming drum is heated and has a circumferential surface for heating and forming dough into a continuous spring-roll skin on the drum surface. The dough is fed to the heating surface of the drum through a feeder, and the skin formed on the heating surface is removed from the drum by using a scraper and is then conveyed by a conveyer belt to a cutting station for cutting the continuous skin into segmented skin sheets, a spinkling station for sprinkling flour onto the segmented sheets, and a subsequent packaging station. Since such a machine is not provided with any means for printing or marking the skins, manufacturers usually utilize screen printing plates to mark or pattern each spring-roll skin sheet via a manual operation. After marking, the skin sheets are sent to a stuffing device to wrap stuffing, such as chopped meat and/or vegetable.

However, as the spring-roll skin sheets are previously sprinkled with flour at the sprinkling station in order to prevent them from sticking to each other when the skin sheets are stacked, the markings on the surface of the skin sheets are usually faint and unclear. In addition, after the skin sheets are marked, the skin sheets have to be turned over so as to face the marked sides of the skin sheets downward and to place stuffing on the unmarked sides of the skin sheets. Therefore, it is desirable that the skin sheets be marked or printed before the flour sprinkling operation and that the unmarked sides of the skin sheets face upwards after the skin sheets are delivered from the skin forming apparatus to facilitate a subsequent stuffing operation.

SUMMARY OF THE INVENTION

An object of the present invention is to provide an apparatus for making spring-roll skin, which incorporates a printing device adjacent to a skin forming drum.

According to the present invention, an apparatus for making a printed spring-roll skin includes: a forming drum having a circumferential heating surface adapted to heat and form dough into a skin; a dough feeder having an inlet, and an outlet adjacent to the heating surface; a scraper disposed adjacent to the heating surface downstream of the outlet relative to a rotating direction of said forming drum and adapted to remove the skin from the heating surface; a printing roller disposed rotatably adjacent to the forming drum and having a circumferential printing surface in contact with the heating surface at a location upstream of the outlet relative to the rotating direction of said forming drum, the printing surface having at least one printing head to impart a pattern to the heating surface; a first gear disposed coaxially with the forming drum; a second gear disposed coaxially with the printing roller and meshed with the first gear; and color supply means connected to the printing roller and adapted to supply a coloring agent to the printing roller.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
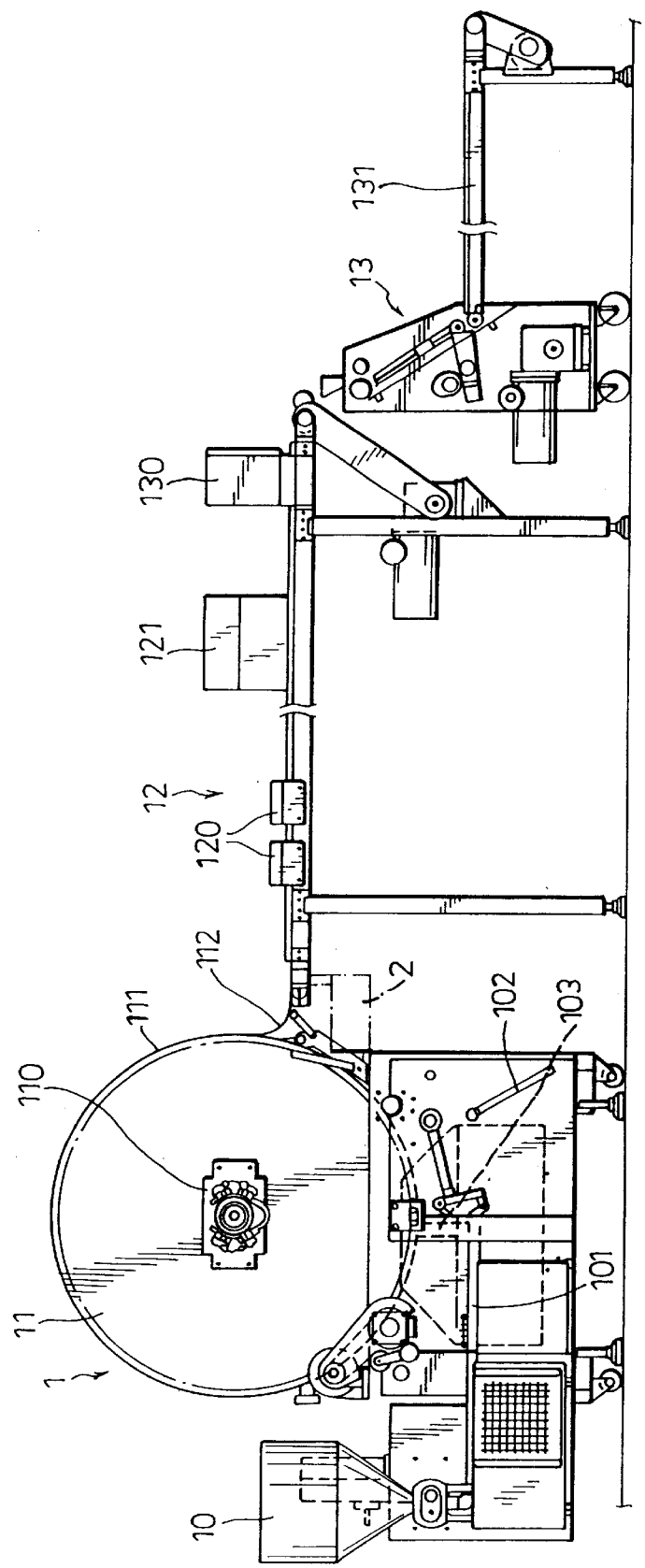
FIG. 1 is a schematic side view illustrating a preferred embodiment of an apparatus incorporating the present invention.
Figure 2:
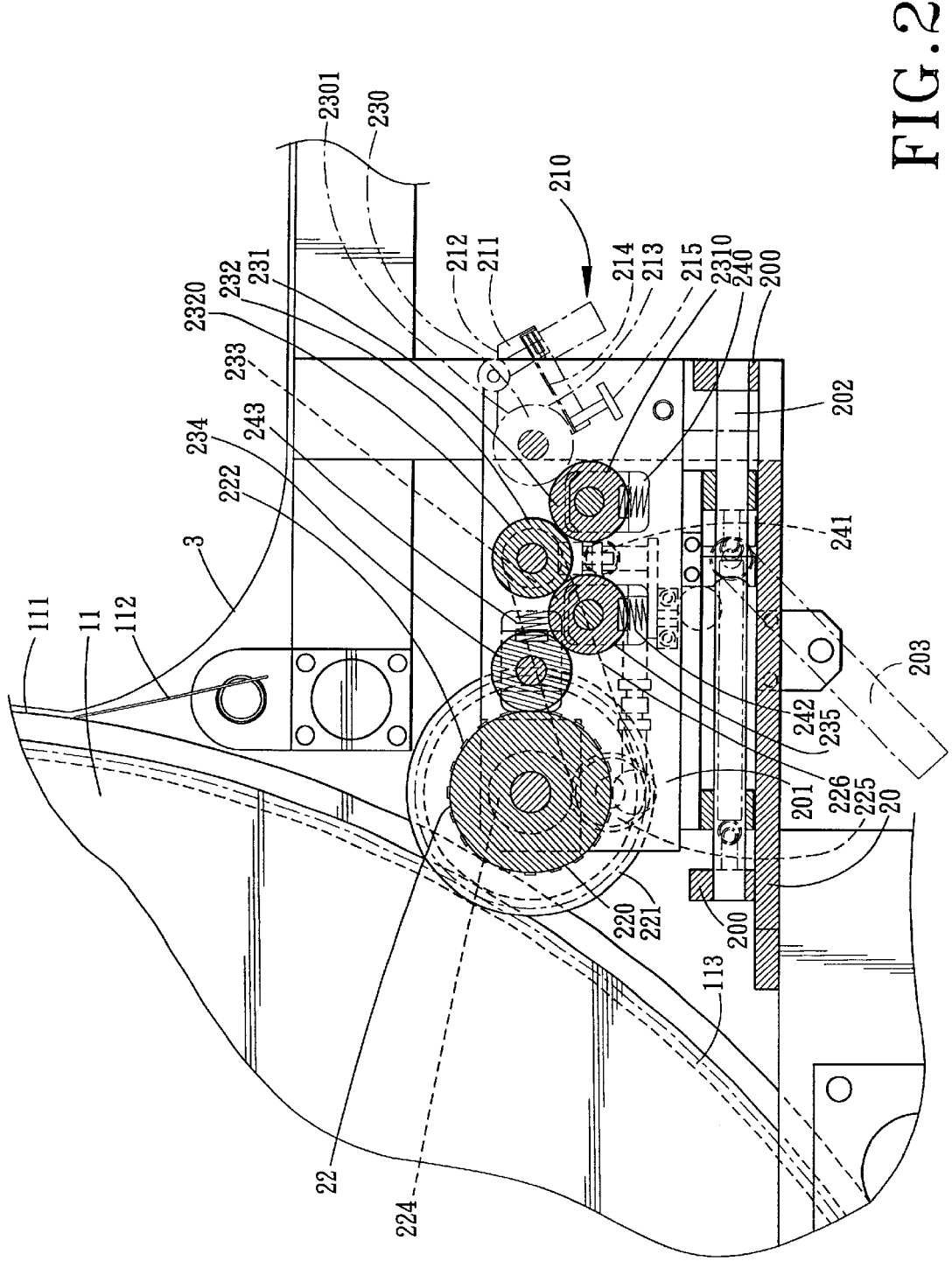
FIG. 2 is a schematic fragmentary side view showing a printing device according to the present invention, which is incorporated into the apparatus of FIG. 1.
Figure 3:
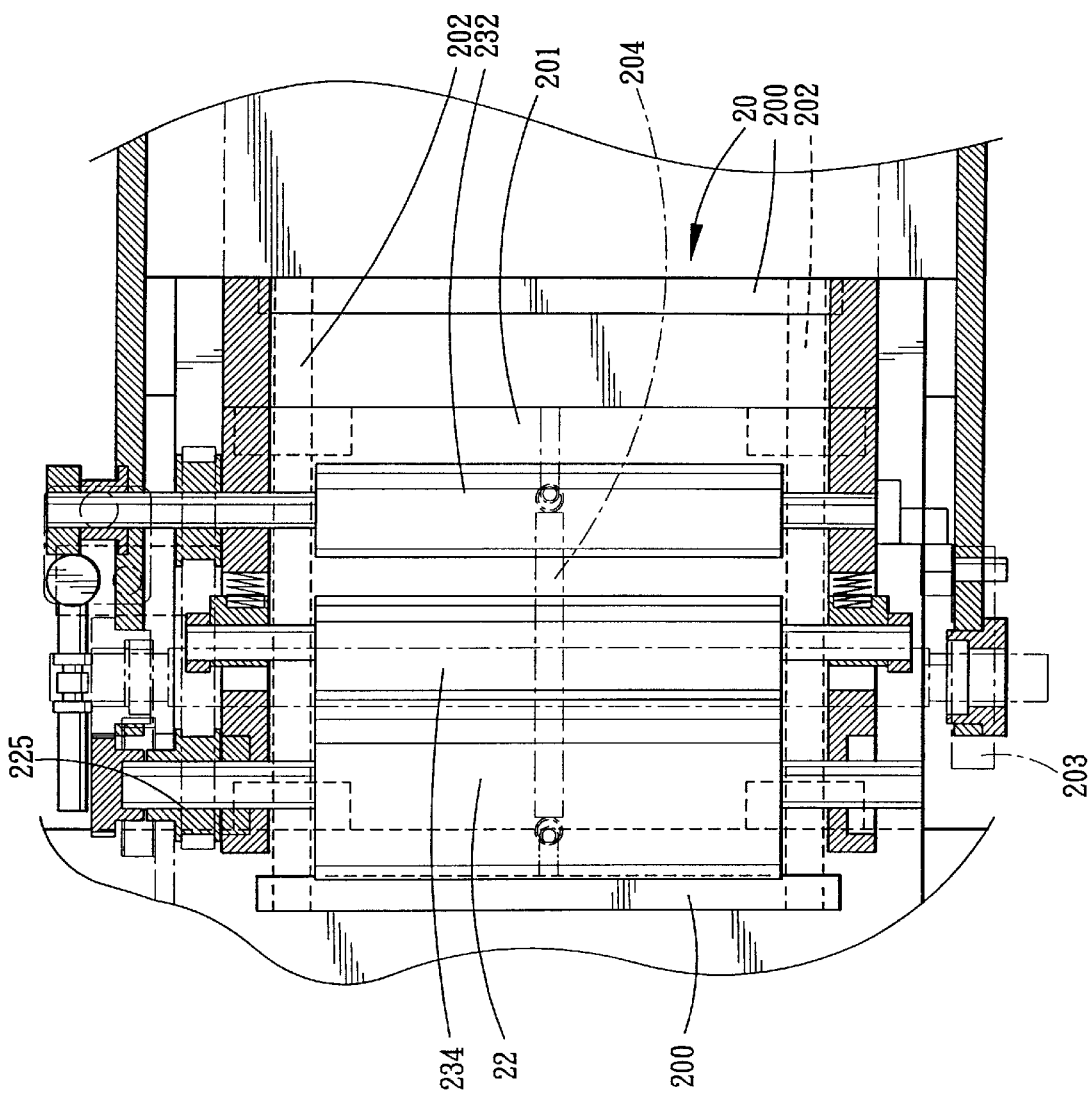
FIG. 3 is a schematic fragmentary top view of the printing device of FIG. 2.
Figure 4:
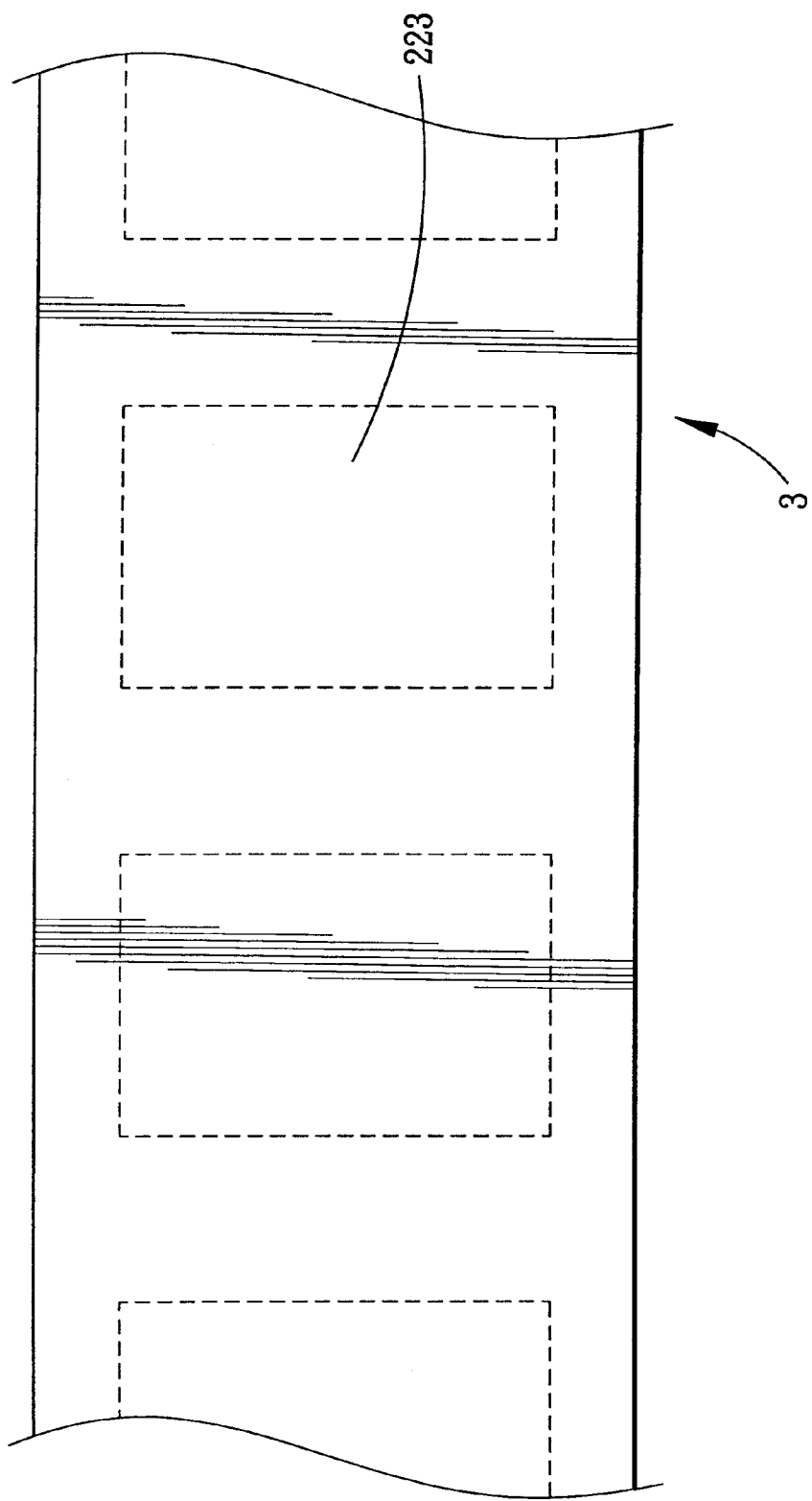
FIG. 4 is a schematic fragmentary view showing a portion of a spring-roll skin formed by the apparatus of FIG. 1.

Referring to FIGS. 1 to 3, a preferred embodiment of an apparatus according to the present invention is shown to include a forming machine 1 for forming a spring-roll skin 3, and a printing device 2 to form prints 223 (as shown in FIG. 4) on the skin 3. The forming machine 1 is conventional and includes a dough feeder 10, a forming drum 11, a conveyer 12 and a cutting device 13. The dough feeder 10 is adapted to contain dough and has a conveying tube 101 with an outlet 103 disposed adjacent to a circumferential heating surface 111 of the forming drum 11. A control handle 102 is provided adjacent to the outlet 103 to control the amount of the dough fed to the heating surface 11 of the forming drum 11. The forming drum 11 is preferably made of metal and is mounted coaxially with a first gear 113. A heating device 110 is provided inside the forming drum 11. The heating surface 111 is arranged such that it contacts the dough as soon as the dough exits at the outlet 103. As dough contacts the heating surface 111, it is adhered to the heating surface 111 and is formed into a continuous skin 3 which is then carried by the heating surface 111 to a downstream side where a scraper 112 is disposed. As such the skin 3 is removed from the heating surface 111 by the scraper 112.

The conveyer 12 is disposed downstream of the scraper 112 to carry the skin 3 removed from the heating surface 111 to a cooling fan 120, and a flour sprinkling device 121 is provided downstream of the cooling fan 120. Finally, the continuous skin 3 is segmented to form sheet segments of a predetermined size by a cutting device 13 which is disposed at the end of the conveying path of the conveyer 12. The flour sprinkling device 121 is adapted to sprinkle flour onto the skin 3 so as to avoid the sheet segments from sticking to one another when stacked.

The cutting device 13 has a control member 130 to control the size of the sheet segments cut by the cutting device 13. A conveyer belt 131 is provided at the downstream side of the cutting device 13 to send the skin sheets to a packaging station (not shown).

The present invention resides in that the forming machine 1 is associated with the printing device 2. As best shown in FIGS. 1 and 2, the printing device 2 is disposed adjacent to the heating surface 111 of the forming drum 11 at a location upstream of the dough feeder 10 relative to the rotating direction of the forming drum 11. The printing device 2 further includes a stationary base 20 mounted on the forming machine 1, and a movable carriage 201 mounted movably on the stationary base 20 to carry a printing roller 22, and a color supply means 210. The stationary base 20 has two support bars 200, and a pair of slide rails 202 bridging the support bars 200. The carriage 201 is mounted movably on the slide rails 202 so that the carriage 201 can be moved along the slide rails 202 to move the printing roller 22 toward or away from the forming drum 11. A manually operable pull lever 203 (see FIG. 2) is connected to one side of the carriage 201 so that the carriage 201 can be operated manually via the pull lever 203. Preferably, a spring 204 (shown in phantom lines) may be arranged by fixing one end of the spring 204 to one of the support bars 200 and another end of the spring 204 to the carriage 201.

The printing roller 22 is mounted rotatably on the carriage 201 and has a circumferential printing surface 220 in contact with the heating surface 111 of the forming drum 11 at a location upstream of the outlet 103 of the dough feeder 10. The printing surface 220 has a plurality of printing heads 222 to impart a pattern to the forming surface 111. The color supply means 210 is also mounted on the carriage 201. The construction of the color supply means 21 is conventional and includes a fountain device 211 for containing and delivering a coloring agent, and a fountain roller 230 disposed adjacent to the fountain device 211 to receive the coloring agent from the fountain device 211. The fountain device 211 has an inlet 212 and an outlet 213 adjacent to the surface 2301 of the fountain roller 230. An adjustment screw 215 is provided to adjust a resilient plate 214 so that the amount of the coloring agent at the outlet 213 is controlled. As a result, the coloring agent with a proper thickness can be maintained on the printing heads 222 of the printing roller 22, and the intensity of the color printed on the spring-roll skin 3 can be controlled.

In this embodiment, the printing roller 22 is made of rubber and is mounted coaxially with a second gear 221 which is meshed with the first gear 113 of the forming drum 11. When the first gear 113 is driven by a power device (not shown), it moves the second gear 221 so that the printing roller 22 is rotated simultaneously with the forming drum 11. The printing heads 222 are separable from the heating surface 111 of the drum 11 and project from the heating surface 111. The ratio of the number of teeth of the first gear 113 to that of the second gear 221 is arranged to be a positive integer, for example, 290:29=10, so that the prints 223 impressed on the heating surface 111 by the printing roller 22 are at equal intervals and can be at the same location as the prints 223 previously impressed on the heating surface 111.

There are intermediate rollers 231, 232, 235 and 234 in contact with each other and disposed between the printing roller 22 and the fountain roller 230 so as to provide a uniform color on the printing roller 22. The roller 231 has a surface 2310 in contact with the fountain roller 230. The fountain roller 230 and the intermediate rollers 231, 232, 235 and 234 are preferably and alternately metal and rubber (i.e. the fountain roller 230 and the intermediate rollers 232, 234, are metal, whereas the intermediate rollers 231, 235 and the printing roller 22 are rubber). The coloring agent from the fountain device 211 is pressed and rolled between the intermediate rollers 231, 232, 235 and 234 and is transferred to the printing heads 222.

As shown in FIG. 2, in addition to the intermediate rollers 231, 232, 235 and 234 which interact to rotate simultaneously, the printing device 2 further includes a third gear 224 which is coaxial with the printing roller 2 and which mates with a fourth gear 225, and a fifth gear 233 connected to the fourth gear 225 via a sprocket chain 226. Besides, there are biasing members 240, 241, 242, 243 which are respectively disposed adjacent the intermediate rollers 231, 232, 235, 234 so as to provide biasing forces through which the intermediate rollers 231, 232, 235, 234 can be kept in intimate contact with each other.

When the first gear 113 rotates, it moves the second gear 221, the printing roller 22, the third gear 224, the fourth gear 225, the sprocket chain 226, and the fifth gear 233. As such, all of the intermediate rollers 231, 232, 235, 234 and the fountain roller 230 rotate simultaneously. The coloring material is transferred from the fountain roller 230 to the printing roller 22 through the intermediate rollers, 231, 232, 234, 235. The printing roller 22 impresses the coloring material on the heating surface 111 of the drum 11 via the printing heads 222.

Referring again to FIG. 1, the dough feeder 10 feeds dough to the heating surface 111 of the drum 11 at the outlet 103, which is arranged such that the dough exiting the outlet 103 contacts the print 233 impressed on the heating surface 111 by the printing roller 22. As the dough contacts the heating surface 111, it is formed into the skin 3 by the heating surface 111. The prints 223 (see FIG. 4) printed repeatedly on the heating surface 111 are transferred successively to the continuous skin 3 which is then carried to the scraper 112. When the skin 3 reaches the cutting device 13, the continuous skin 3 is segmented to form separate sheets.

As the prints 223 on the skin 3 are arranged at equal intervals, each print 223 can be formed at a predetermined position of the corresponding sheet segment of the skin 3. With the intermediate rollers 231, 232, 235, 234 which are alternately metal and rubber, the coloring material can be uniformly transferred to the printing roller 22. Since the prints 223 are provided on the skin 3 at the side confronting the heating surface 111, the marked side of the skin 33 faces downward after the skin 3 leaves the heating surface ill. This can facilitate a subsequent operation of stuffing the sheet segments because stuffing can be placed directly on the upper side of the sheet segments. Moreover, due to the printing of the skin 3 at the upstream side relative to the flour sprinkling device 121, the skin 3 can be printed effectively.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for making a printed spring-roll skin from dough, comprising:

a forming drum having a circumferential heating surface adapted to heat and form the dough into a skin;

a dough feeder having an inlet, and an outlet adjacent to said heating surface;

a scraper disposed adjacent to said heating surface downstream of said outlet relative to a rotating direction of said forming drum and adapted to remove the skin from said heating surface;

a printing roller disposed rotatably adjacent to said forming drum and having a circumferential printing surface in contact with said heating surface at a location upstream of said outlet relative to the rotating direction of said forming drum, said printing surface having at least one printing head to impart a pattern to said heating surface;

a first gear disposed coaxially with said forming drum;

a second gear disposed coaxially with said printing roller and meshed with said first gear; and color supply means connected to said printing roller and adapted to supply a coloring agent to said printing roller.

2. The apparatus as claimed in claim 1, wherein said color supply means comprises a fountain device, and a fountain roller disposed adjacent to said fountain device and adapted to receive the coloring agent from said fountain device.

3. The apparatus as claimed in claim 2, further comprising a plurality of intermediate rollers which are disposed between said printing roller and said fountain roller and which are in contact with each other and with said printing roller and said fountain roller.

4. The apparatus as claimed in claim 1, further comprising a stationary support disposed adjacent to said heating surface, and a carriage movably mounted on said support for moving toward or away from said heating surface, said printing roller and said color supply means being mounted on said carriage.

5. The apparatus as claimed in claim 4, wherein said support includes a pair of guide rails, said carriage being mounted movably on said guide rails.

6. The apparatus as claimed in claim 5, wherein said carriage further includes an operating lever for manual control of the movement of said carriage.

* * * * *